(12) United States Patent
Bedetti

(10) Patent No.: US 9,452,398 B2
(45) Date of Patent: Sep. 27, 2016

(54) FLUID BED GRANULATION PROCESS

(75) Inventor: Gianfranco Bedetti, Milan (IT)

(73) Assignee: Casale SA (CH)

( * ) Notice: Subject to any disclaimer, the term of this patent is extended or adjusted under 35 U.S.C. 154(b) by 1020 days.

(21) Appl. No.: 12/520,734

(22) PCT Filed: Dec. 21, 2007

(86) PCT No.: PCT/EP2007/011366
§ 371 (c)(1),
(2), (4) Date: Jan. 26, 2010

(87) PCT Pub. No.: WO2008/092499
PCT Pub. Date: Aug. 7, 2008

(65) Prior Publication Data
US 2010/0140827 A1 Jun. 10, 2010

(30) Foreign Application Priority Data
Dec. 22, 2006 (EP) .................................. 06026755

(51) Int. Cl.
*B01J 2/16* (2006.01)
(52) U.S. Cl.
CPC ........................................ *B01J 2/16* (2013.01)
(58) Field of Classification Search
CPC ......................................................... B01J 2/16
USPC ............................................................ 264/117
See application file for complete search history.

(56) References Cited

U.S. PATENT DOCUMENTS

| 4,353,730 A | 10/1982 | Kinno et al. |
| 2004/0013761 A1 | 1/2004 | Huttlin |
| 2005/0034322 A1 | 2/2005 | Huttlin |
| 2008/0299305 A1 * | 12/2008 | Bedetti .......................... 427/213 |

FOREIGN PATENT DOCUMENTS

| EP | 1707258 A1 | 10/2006 |
| WO | 02/083320 A1 | 10/2002 |
| WO | 2005/097309 A2 | 10/2005 |

* cited by examiner

*Primary Examiner* — Larry Thrower
(74) *Attorney, Agent, or Firm* — Akerman LLP

(57) ABSTRACT

Fluid bed granulation process comprising the steps of: —forming a fluid bed of seeds (S1) of a chosen substance, —feeding said fluid bed with a continuous fluid flow (L) comprising a growth liquid, —inducing and maintaining a continuous vortex (V) in said fluid bed, the vortex (V) having a substantially horizontal axis, characterized in that said fluid flow (L) is fed into predetermined first zones (Z1) of said fluid bed, said first zones (Z1) being alternated to second zones (Z2) of said fluid bed in which said fluid flow (L) is not fed.

9 Claims, 3 Drawing Sheets

FLUID BED GRANULATION PROCESS

FIELD OF APPLICATION

In its most general aspect the present invention relates to a fluid bed granulation process of a suitable substance like, for example (not limiting), urea, ammonium nitrate, ammonium chloride and other similar substances susceptible to be granulated.

Particularly, this invention concerns a fluid bed granulation process, where granules of a chosen substance are obtained through continuous growth (of both volume and mass) of granule's seeds of that substance or another substance, continually fed in said fluid bed, simultaneously with a flow of a suitable growth substance in the liquid state.

In the following description and attached claims, the expression: "granule's seed of a chosen substance" is generally meant to indicate particles of the substance to be granulated or another substance being equal or less than about 2 mm in diameter. Furthermore, to simplify, the term "seeds" will be used to indicate the granule's seeds.

The growth substance may be of the same nature of the substance to be granulated and is in liquid state, suited to wet, stick and solidify on the seeds and on the growing granules which, together, form said fluid bed.

This invention also refers to a granulation apparatus, suitable to carry out the aforesaid process.

PRIOR ART

It is known that to reach a good granulation outcome (prearranged granule's dimension, shape and mass) with a fluid bed process of the above type, a good "wetting" of both the seeds and the growing granules by the growth liquid is required. And, to this end, the growth liquid must be fed to the fluid bed in the form of the least possible droplets, certainly less than the seeds and the growing granules, which said droplets are to get in touch with. For example, as for the urea, this allows the evaporation of water contained in the growth liquid (solution of urea), so as to obtain a high purity final product (granules). Usually, the growth liquid's droplets size is crucial to allow the evaporation of the solvent that may be inside said growth liquid.

At most, said growth liquid should be fed in the so-called "atomized" form. In this condition, actually, the growth liquid is able to get in touch one by one with all the seeds or granules suspended in the fluid bed and to allow an efficient evaporation of the solvent contained in the growth liquid.

In order to atomize the growth liquid, the prior art makes use of specific nozzles fed with said liquid and with large volumes of air (or other suitable gas) having high speed, for example comprised between 100 m/s and 300 m/s.

After being wetted, the seeds and the growing granules are subjected to an evaporation step of the solvent that may be inside said growth liquid and, at the end of the granules' growth, to a solidification/consolidation step.

A process of this kind, for the urea production, is described for example in U.S. Pat. No. 4,353,730.

However, this prior art's fluid bed granulation processes suffer of recognized drawbacks, including the substantial impossibility of controlling the particle size of the finished product within a predetermined range of values and the high operating costs. Indeed, the granules wetting by atomising unevenly distributed, substantial amounts of said liquid with large amounts of high-speed air, and this notoriously prevents an adequate, satisfactory control of the growth of the granules inside the fluid bed.

Moreover, the aforementioned drawback involves classification and screening operation of the produced granules, the always considerable waste of granules of unacceptable size (too big or too little), recovery operations of such waste and its recycle upstream to the granulation process.

In order to overcome the above drawbacks, it has been proposed in the art to perform the fluid bed granulation process cyclically by feeding a flow of growth liquid and creating a continuous vortex in said fluid bed through said flow of growth liquid and/or a flow of air or other gases flow.

A process of this type is disclosed for example in the applications WO 02/083320 and WO 2005/097309 to the same Applicant, in particular for obtaining urea granules.

Although a fluid bed granulation process as above is advantageous in several aspects, in particular because it allows an efficient control of dimensions of the final granules, further improvements are needed in the art directed to enhance hardness of the granules while maintaining an efficient control of their size so as to reduce formation of dusts not only during granules production but also after production, for example during transport and/or handling operations of the granules.

SUMMARY OF THE INVENTION

The problem underlying the present invention is to devise and to make available a fluid bed granulation process having functional characteristics that allow to obtain granules of the desired substance with an appropriate hardness as well as a controlled granulometry.

This problem is solved by a fluid bed granulation process comprising the steps of:
  forming a fluid bed of seeds of a chosen substance,
  feeding said fluid bed with a continuous fluid flow comprising a growth liquid,
  inducing and maintaining a continuous vortex in said fluid bed, the vortex having a substantially horizontal axis, characterized in that said fluid flow (L) is fed into predetermined first zones of said fluid bed, said first zones being alternated to second zones of said fluid bed in which said fluid flow is not fed.

The above technical problem is also solved by a fluid bed granulator comprising a container substantially parallelepiped in which a fluid bed is generated, the container having a bottom (3) permeable to a fluidification flow of air or other suitable gas, defined between two opposite long side walls and two opposite short side walls, the latter being a head wall and a discharge wall of final granulate, respectively, the granulator being characterized in that it comprises a succession of distributors provided along at least one of said long side walls (4, 5) in a predetermined distance to each other, for feeding said fluid flow at predetermined first zones of said fluid bed.

Further characteristics and the advantages of the invention will be better shown from the description of illustrative and non limiting embodiments of a granulation process according to the invention, said description being made hereinafter with reference to the enclosed drawings.

SHORT DESCRIPTION OF THE DRAWINGS

DETAILED DESCRIPTION

Figure 1:
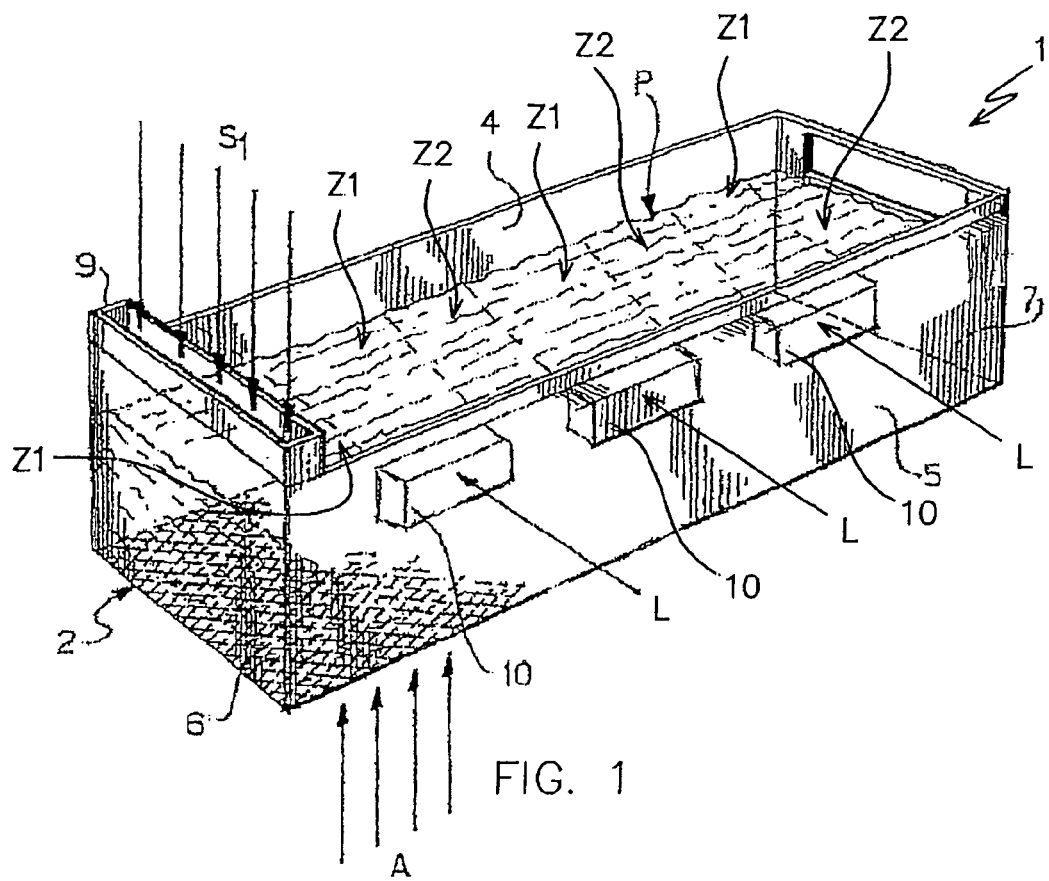
FIG. 1 shows schematically a perspective view of an apparatus (granulator) for the implementation of the granulation process of the present invention.
Figure 2:
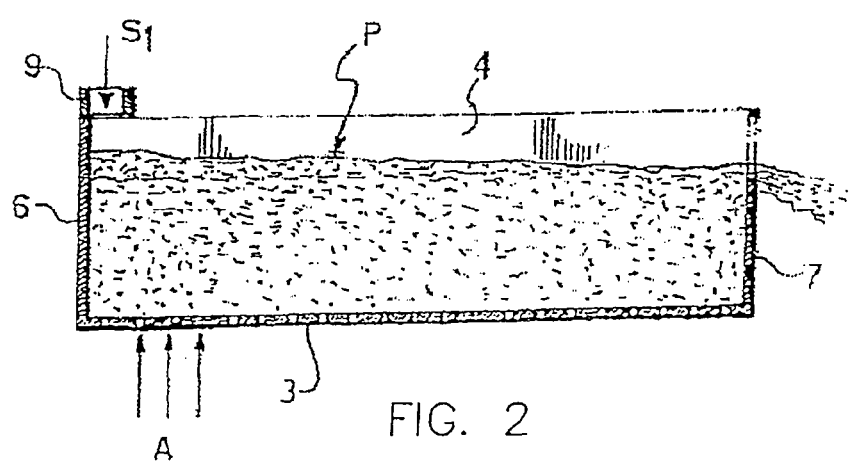
FIG. 2 shows the granulator of FIG. 1 in longitudinal section.

With reference to FIGS. 1 to 4, a fluid bed granulator according to the present invention, indicated as a whole with 1, comprises a container 2, represented open at the top, of substantially parallelepiped shape, in which a fluid bed is intended to be obtained, as will result from the prosecution of the description.

Said container 2 has a bottom 3, permeable to gas, for example made up of a perforated element, situated between two opposite long side walls 4, 5 and two opposite short side walls 6, 7. In the remainder of the description, the short side wall 6 is also called: head wall of granulator 1, whereas the opposite wall 7 is also called: discharge wall of the (granulated) final product. This because the wall 7 is provided with a discharge means (not shown) for the final granules, predetermining the total height of the fluid bed to be obtained.

Said discharge means for the final granules may be for instance an opening 8 (essentially a weir), preferably extended to all the width of wall 7 and to a height on bottom 3, predetermined according to the thickness of the fluid bed to be obtained in said container 2.

Alternatively, any other appropriate discharge means may be used such as for example an automatic valve operated by the fluid bed level.

At the upper side of the head wall 6 a device is supported, schematically represented with 9, per se conventional and therefore not described in detail, for the uniform feeding of a continuous flow of seeds $S_1$, inside the container 2 along said wall 6.

In accordance with an aspect of the present invention, a succession of distributors 10, each of them including a plurality of nozzles (not shown), is supported along the long side wall 5 in a predetermined distances to each other, through conventional supporting means (not represented).

Said succession of distributors 10 spans over substantially all the length of wall 5 and at a prearranged height from the bottom 3, according to the fluid bed's thickness obtained in said container 2. In particular, the distributors 10 are set on the long side wall 5 at a height below the free surface P of the fluid bed obtained in the container 2.

According to the present invention, each distributor 10 feeds (through its nozzles) a fluid flow L comprising a selected growth liquid in predetermined zones Z1 of the fluid bed formed in the container 2, said zone Z1 substantially spanning over the entire transversal extension of the container 2 and being delimited longitudinally (with reference to the longitudinal extension of the container 2) by portions of the long side walls 4 and 5 supporting a respective distributor 10. In addition, as schematised in FIG. 1, said zones Z1 fed with the fluid flow L comprising the growth liquid are alternated with zones Z2 of said fluid bed which are not fed with said flow liquid L, the zones Z2 also substantially spanning over the entire transversal extension of the container 2 and being delimited longitudinally (with reference to the longitudinal extension of the container 2) by portions of the long side walls 4, 5 separating two successive distributors 10.

In accordance with an advantageous aspect of the invention, in the succession of the distributors 10 of the fluid flow L located on the wall 5, the end distributors 10 are set to a predetermined distance from the head wall 6 and the discharge wall 7 respectively.

In this way, the process starts treating the seed of the substance to be granulated in the first zone Z2 (that is the zone Z2 close to the head wall 6) and ends treating the grown granules in the last zone Z2 (that is the zone Z2 close to the discharge wall 7).

The granulator 1 of the present invention also comprises, in a position below the container 2, a blowing system (not represented, as it is conventional) of air A or other gaseous fluid, which is provided for creating and maintaining a fluid bed of granules inside the container 2 as well as a continuous vortex having a substantially horizontal axis in said fluid bed.

In this regard, the perforated bottom 3 is provided with suitable conventional means for obtaining a non-homogeneous distribution of the air flow A into the container 2 (for example by dividing said flow A in fractions having different rates or by varying the entry direction of such a flow in the fluid bed), so as to create and maintain a vortex V in the fluid bed.

Preferably, said conventional means may be chosen among those disclosed in the application WO 2005/097309 to the same Applicant such as for example a non-homogeneous distribution of holes in the bottom 3, formation of holes of different diameter or inclined holes in the bottom 3.

With reference to the apparatus above schematically described (FIGS. 1 to 4), an example of implementation of the granulation process of the present invention is now illustrated.

In steady state conditions, a fluid bed of seeds $S_1$ of the selected substance to be granulated and of growing granules, in container 2, is fed continuously through the distributor 9 at the head wall 6. Such fluid bed is obtained, supported and maintained, by means of an appropriate continuous flow of air A, fed from below and continuously inside the container 2, through its perforated bottom 3. For this reason said air A is also called fluidification air.

Figure 3:
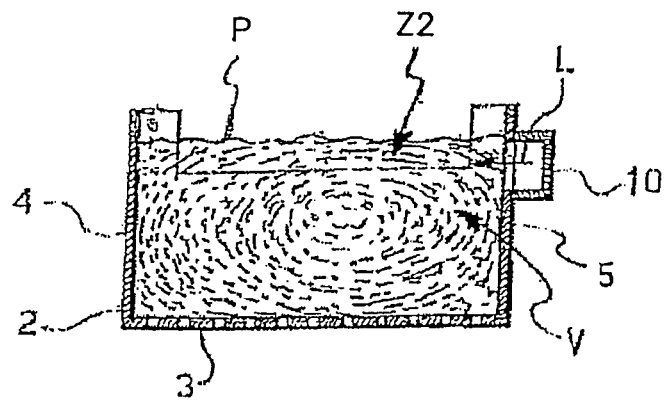
FIGS. 3 and 4 show each the granulator of FIG. 1 in respective transversal sections, corresponding to the above defined first and second zones.
Figure 4:
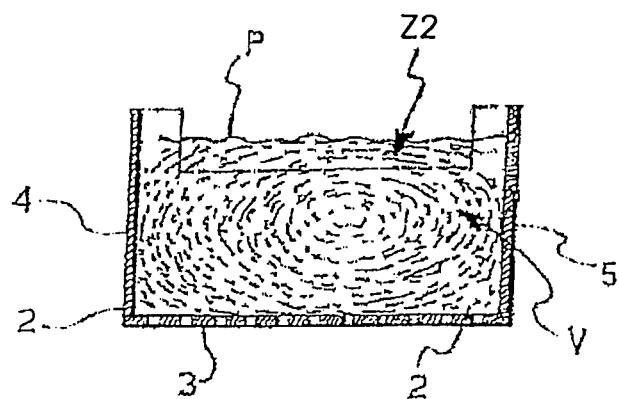

In addition, the fluid flow A, crossing the bottom 3, is distributed inside the bed in a non-homogeneous manner so as to create and maintain a continuous vortex V with a substantially horizontal axis in said fluid bed, as represented in FIG. 3. The vortex V is circumscribed between walls 4-7 and the bottom 3 of the container 2.

The thickness of the fluid bed is so that it's free surface reaches a level which is determined by the control of the granules discharge outside the container 2 (for example through said opening 8 or an automatic discharge valve). Such continuous discharge, counterbalanced by the continuous feeding of seeds $S_1$ determines in the fluid bed a kind of "fluid vein", flowing from head wall 6 towards the opposite wall 7, the free surface P being slightly tilted down in the direction of the flowing bed.

According to this configuration, the seeds S1 are located only near the head of the granulator 1 (wall 6) in the first of the zones Z2, while in the remaining part of the fluid bed are present growing granules.

Advantageously, the presence of a zone Z2 close to the head wall 6 (i.e. in the location of seeds S1) allows to establish a regular vortex for the seeds Si before they are wetted by the growth fluid. In addition, the seeds Si are advantageously pre-heated by the air flow A.

It should further be noted that the fluidification air A, blown from below into the container 2, crosses the fluid bed and carries out a thermal exchange with the growing granules that form such fluid bed (for the reasons that will be described hereinbelow), heating itself progressively. Indeed, the fluidification air A removes the solidification heat of a growth fluid fed onto the seeds $S_1$ and onto the growing granules, as will be described afterwards in the description.

According to the present invention, a continuous (hot) fluid flow L is introduced into the container 2 at said predetermined zones Z1 of the fluid bed. In particular, this fluid flow L is introduced at the upper layer of the zones Z1, which comprises the free surface P of the fluid bed, but below it, that is at the hotter layer of the fluid bed.

The fluid flow L may comprise an atomized growth liquid relatively diluted in a solvent. For instance, in the case of urea granule production, the atomized growth liquid can contain molten urea from 94% up to near 100% (weight percent), the balance being water (solvent).

This flow L is supplied by said distributors 10 provided along all the length of the wall 5 with predetermined flow rate and momentum flux (momentum) and it is approximately oriented (crosswise or angularly) to the above mentioned "fluid vein".

In the zones Z1, the individual granules of the substance to be granulated (or seeds in the case of the zone Z1 following the zone 2 close to the head wall 6) located in the upper layer of the fluid bed (upper zone of the vortex V), are hit (wetted) many times with the particles of atomized growth liquid of flow L, with solidification of the substance and partial evaporation of the solvent that may be inside said growth liquid. This, in the zones Z1, increases the temperature of the granules in upper zone of the vortex V. The individual "wetted" granules are furthermore stressed and pushed towards the opposite wall 4 of the container 2 by the vortex caused by the air flow A. Thanks to the existence of vortex V, the individual granules, deflect naturally towards the bottom 3 of the container 2, when they reach the proximity of wall 4.

In the course towards bottom 3, the individual wetted granules leave the upper hot layer of the fluid bed (upper zone of the vortex) in order to cross the lower layers (lower zone of the vortex V), progressively colder. During this course some growth liquid's consolidation step is carried out on the seed's surface. This step is completed during the course of the individual granules, pushed by the above-mentioned vortex V towards the wall 5, obtaining respective granules, with slightly superior volume and mass. The individual growing granules thus formed, deflect near the wall 5 towards the upper hot layer of the fluid bed, always pushed by the vortex V.

Once the upper hot layer is reached, the individual growing granules come into contact with the atomized growth liquid and they are pushed towards the wall 4 by the vortex V. These granules substantially repeat the course described above and on them the same steps of wetting, solidification and evaporation are repeated with consequent further volume and mass growth, up to their travel along said zone Z1 close to the head wall 6.

The growing granules obtained at the end of each zone Z1, pushed by the longitudinal fluid vein, then pass in an adjacent zone Z2 which is not fed with the fluid flow L. In each zone Z2, the growing granules are subjected to drying by the flow of air A or other suitable fluidification fluid, which allows substantial evaporation of the residual solvent of the growing liquid and recover of the solidification heat, thereby obtaining a further consolidation for the growing granules that advantageously improves their mechanical properties, in particular their hardness.

At the end of the processing in the last zone Z2 (that close to the discharge wall 7), the grown granules are then discharged out from the wall 7.

Summarizing, in each zone Z1, the growing granules are subjected to the above steps of wetting/solidification/consolidation and some solvent evaporation which results in a growth of their volume and mass while in each zone Z2, the granules already grown in a preceding zone Z1 are subjected to a substantial drying and consolidation which increases hardness.

It should be noted that, according to this embodiment of the invention, the produced granules are granulometrically polidispersed in a very little range, for example with 90% of the granules measuring from 2 to 4 mm diameter, thus obtaining a product directly marketable. In the prior art processes, a similar commercial product is obtainable only by sieving the granulator output, and recycling up to the 50% of the total, as milled oversize or undersize granules.

This is advantageously made possible thanks to the fact that every growing granule undergo substantially a same growing process, since the operating time of each cycle of wetting/solidification/evaporation consolidation inside the zones Z1 of the fluid bed and each cycle of drying in the zones Z2 of the fluid bed as well as the number of cycles to be carried out inside the fluid bed can be controlled, by controlling all the process parameters set forth in the description herein such as flow rate of the fluidification air flow in the different zones of said fluid bed, flow rate and orientation of the grow fluid etc. . . .

Consequently, the granules produced according to this invention, thanks to the drying steps in the zones Z2 of the fluid bed, show increased mechanical properties (in particular hardness) which results in a substantial reduction of dusts both during production of the granules and after production, for example during their transport and/or handling operations.

Together with the possibility of obtaining a final product of suitable granulometry, i.e. directly marketable, this advantage allow to substantially reduce the investment and maintenance costs, as well as the energy consumption, of the corresponding granulating plant.

Figure 5:
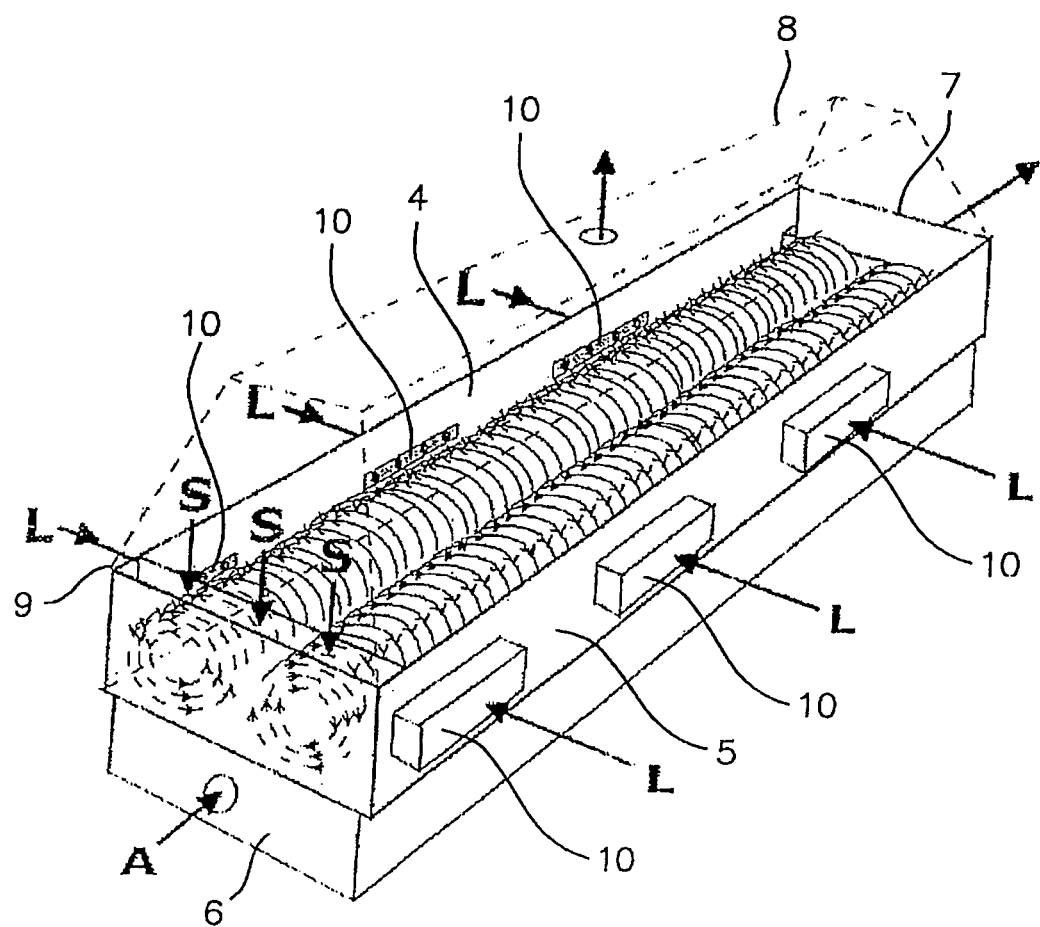
FIG. 5 shows a perspective view of a granulator according to an alternative embodiment of the present invention.

With reference to FIG. 5, the granulation process according to the present invention is implemented obtaining in the fluid bed, made first of seeds S1 and then of growing granules, two opposite helical vortex V1 and V2, of the type described above. To this aim, the container 2 is provided, on both opposite long side walls 4, 5, with respective succession of distributors 10a, 10b for supplying flows L, L1 of the same growth liquid and with a bottom 3 provided with through holes 11, arranged according to symmetrically opposite and equal distributions, with respect to a middle axis M-M.

In this figure, the features of granulator 1, structurally and functionally equivalent to those illustrated in the preceding figures will be referred to with the same reference numbers and will not be described any further.

So doing, it is possible to double the production yield of the granulator suitable to carry out the granulation process of the invention, while keeping constant the container 2 length and the operating conditions of the fluid bed.

It should be noted that in this embodiment, the granular may be provided with a hood 8 on the container 2 (shown in broken lines) for extraction of fumes comprising air and the solvent removed by the growth fluid.

In the present invention, particularly satisfactorily results for vortex (or vortexes) formation have been obtained feeding the flow L comprising the growth liquid, in the zones Z1 of the fluid bed, at a velocity comprised between 2 and 50 m/s, through a succession of 2 to 20 distributors along a single long side wall. The distributor spacing between consecutive distributors may be the same or different depending on the substance to be granulated and it is preferably in the order of magnitude of the distributor length.

The invention thus conceived may be susceptible to variations and modifications, all falling within the scope of protection defined in the following claims.

The invention claimed is:

1. A fluid bed granulation process comprising the steps of:
   forming a fluid bed of seeds of a chosen substance within a substantially parallelepiped container, having a perforated bottom comprised between two opposite side walls, and two opposite discharge and head walls, wherein the side walls are longer than the discharge and head walls,
   feeding said fluid bed with a continuous fluid flow comprising a growth liquid,
   inducing and maintaining a continuous vortex in said fluid bed, the vortex having a substantially horizontal axis,
   wherein said fluid flow is fed into predetermined first zones of said fluid bed from at least one of the side walls of said container through corresponding distributors facing said first zones of the fluid bed, said first zones being alternated to second zones of said fluid bed in which said fluid flow is not fed along said at least one of the side walls of said container.

2. The process according to claim 1, wherein said fluid bed is formed and said vortex is induced and maintained through a fluidification flow of air or other gases.

3. The process according to claim 1, wherein said fluid flow comprising the growth liquid is fed in said first zones below a free surface of said fluid bed.

4. The process according to claim 3, wherein said flow comprising growth liquid is fed in said first zones in the proximity of said free surface of said fluid bed.

5. The process according to any claim 1, wherein, in said first zones of the fluid bed, the vortex includes an upper area for seed wetting, solidification and evaporation of possible solvent contained in said flow and a lower area for consolidation of the growth liquid.

6. The process according to claim 1, wherein, in said second zones of the fluid bed, a drying step of growing granules of said substance is achieved.

7. The process according to claim 1, wherein said container also has a discharge means of the final product at the discharge wall, said continuous vortex being extended from said head wall to said discharge opening with a helical motion.

8. The process according to claim 1, wherein seeds are fed into said fluid bed continuously through a distributor at the head wall.

9. The process according to claim 8, wherein said flow comprising the growth liquid is fed into said first zones of the fluid bed at the opposite side walls of said container and in that two opposite helical vortex are formed in said fluid bed through a fluidification flow of air or other gases.

* * * * *